United States Patent [19]
de Koning

[11] Patent Number: 4,945,861
[45] Date of Patent: Aug. 7, 1990

[54] DOG LEAD

[75] Inventor: Frank de Koning, Leiden, Netherlands

[73] Assignee: Adrianus W.A.J. van den Elshout, Netherlands

[21] Appl. No.: 279,813

[22] Filed: Dec. 5, 1988

[30] Foreign Application Priority Data

Dec. 7, 1987 [NL] Netherlands .......................... 8702947

[51] Int. Cl.⁵ .............................................. A01K 27/00
[52] U.S. Cl. ..................................... 119/109; 119/111; 272/DIG. 9
[58] Field of Search .......... 119/29, 106, 107, 109 OR, 119/111, 115; D30/151–153; 2/312; 224/163; 272/DIG. 9

[56] References Cited

U.S. PATENT DOCUMENTS

| | | | |
|---|---|---|---|
| 2,356,715 | 8/1944 | Webster | 119/109 |
| 3,458,188 | 7/1969 | Infante | 2/312 |
| 4,134,364 | 1/1979 | Boncela | 119/111 |
| 4,292,932 | 10/1981 | Wooderson | 119/109 |
| 4,358,036 | 11/1982 | Maltais | 224/163 |

Primary Examiner—John Weiss
Attorney, Agent, or Firm—Watson, Cole, Grindle & Watson

[57] ABSTRACT

The dog lead according to the invention is connected on the one end to the collar of the dog while the other end is connected for instance to the trouser belt of the person in charge of the dog. The lead is connected to the trouser belt via an elongate member with a form similar to a crane jib such that, with a correct choice of the length of the lead, the dog is subjected to a tug on the collar since the moving leg exerts a tensile force on the lead because of the "jib", and the dog cannot therefore get in front of the bearing leg.

4 Claims, 1 Drawing Sheet

DOG LEAD

Dogs having the annoying tendency of getting under people's feet. This is true both when the dog is on a lead and when it is running free. This characteristic is troublesome for someone walking, and even dangerous for a runner for instance. When a dog cuts suddenly across the path of a runner, this can lead to a fall with all its consequences. This danger is certainly present when the runner is a dog owner who wants to take his dog with him on a lead. It is the intention in such a case that the dog stays next to its owner. Normally on the left-hand side. The lead to which the dog is attached has then to be dimensioned such that the animal has sufficient freedom to be able to run with its owner, but insufficient space to run into the path of its owner.

The dog must be on lead such that when the dog owner takes a step forward, and particularly when, in the case the dog is being led on the left, he takes a step with his left leg, the dog is able to follow this forward movement, while, when the left leg is to the rear, there should not be enough space to give the dog the opportunity to get in front of the bearing leg. The invention has for its object to provide a dog lead which satisfies the above requirements.

This is attained according to the invention with a dog lead as specified in claim 1.

When a dog lead according to the invention is arranged in the correct manner at the back of the dog owner to a piece of clothing, the elongate member has the function of a crane jib placing the attachment point of the dog lead at a distance behind the body of the dog owner. Since the dog lead runs sloping downward from the point of attachment to the elongate member, in the critical situation when the leg of the dog owner is moved to the rear, the thigh of the owner will come into contact with the lead and move it rearward such that insufficient space is created for the dog to get in front of the rearward directed leg. Moreover, as a result of this effect a light pull is exerted on the collar of the dog. As a result, after a period of time the dog is conditioned such that the tendency of the dog to go too far forward or run in front of its owner's legs is greatly lessened, and this becomes part of the dog's acquired behaviour. In addition to preventing accidents the dog lead according to the invention therefore also offers the possibility to train the dog in its behaviour.

The steps as described in claim 3 are preferably taken. This offers the possibility of placing the elongate member in a position that is optimal taking into account the size of the dog, the length of the lead and the height of the dog owner. If the steps as according to claim 1 are applied, when a tensile force is exerted on the elongate member, there occurs a slight tilting movement which results in the elongate member being fixed relative to the item of clothing, the trouser belt for instance. When the steps as according to claim 1 are applied, the danger of the elongate member shifting unintentionally relative to the trouser belt is eliminated.

Figure 1:
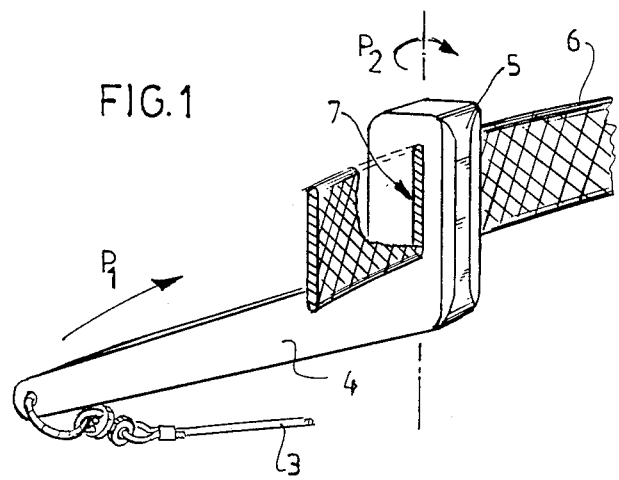
FIG. 1 shows in perspective view the dog lead according to the invention.
Figure 2:
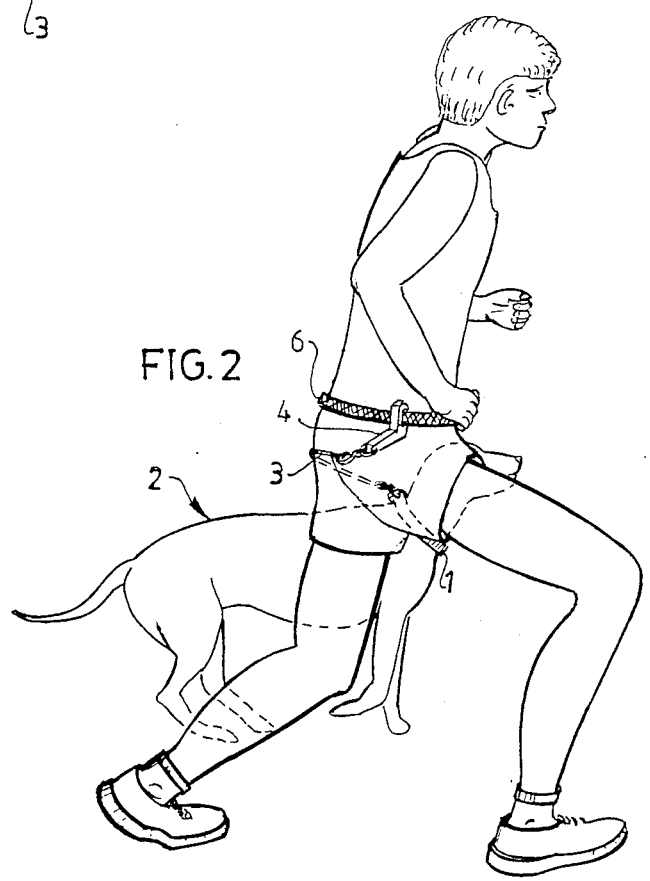
FIG. 2 shows an illustration of the use of the dog lead according to FIG. 1.

The lead 3 for connection to the collar 1 of the dog 2 is connected to the outer end of an elongate member 4 which has a crane jib function. An elongate member 4 can be connected to an item of clothing, for example belt 6, to be worn by the user, using the end portion 5 further away from the lead. The connection of the elongate member 4 and belt 6 can be effected by sliding the belt 6 through the groove 7 in the end portion 5 of elongate member 4. The elongate member 4 is preferably of slightly flexible material possessing a comparatively large coefficient of friction. The result of this is that the elongate member 4 cannot shift relative to the trouser belt 6, or can only do so with great difficulty, particularly when the elongate member 4 swings back and forth, as is indicated with arrows P1 and P2, as a result of tension on the lead 3. Such a tensioning of the lead 3 occurs when the dog 2 threatens to move too far forward. At this critical moment the elongate member 4 is therefore safely locked against any slipping along the trouser belt 6. When the lead 3 is free of tension, the elongate member can then be shifted along trouser belt 6. This offers the opportunity of fixing the elongate member 4 in the position relative to the trouser belt that is optimal in view of the length of the lead 3, the size of the dog 2 and like considerations.

I claim:

1. A device for controlling a dog, which comprises the combination of anchoring means including a groove of generally rectangular cross-section for slidably and frictionally receiving a wearer's belt and including a cantilever portion adapted to project rearwardly of the wearer to terminate in an attaching point disposed behind the wearer, an elongate lead secured to the anchoring means at said attaching point and having a dog collar attached at its free end, the length of the lead being such that the lead extends laterally from the attaching point to pass behind and across the posterior of the wearer and thence forwardly to one side of the wearer's thigh to position the collar slightly ahead of such thigh, said anchoring means being made of resilient material having a high coefficient of friction to resist movement of the anchoring means on the belt when a dog applies tension to the lead to swing the attaching point laterally with respect to said anchoring means while resiliently resisting forward pull on the collar by the dog.

2. A device for controlling a dog comprising an internal body including a first end portion having a forward portion adapted to be disposed adjacent the body of a wearer, said first end portion including a pair of opposite side portions and a rear portion disposed opposite said forward portion, a passageway formed through said first end portion and opening through said side portions for slidably receiving the belt of a wearer therethrough, said body including an elongated portion extending rearwardly from said first end portion and terminating in a second end portion remote from said first end portion, an elongated lead connected to said second end portion and having an outer end connected to a dog collar, the length of said lead being such that the lead extends laterally from the attaching point to pass behind and across a wearer's thigh so that a dog wearing the dog collar cannot get in front of the wearer's leg, whereby tension applied to the lead by a dog swings said second end portion laterally and causes said first end portion to turn with respect to the adjacent portions of a wearer's belt to resist relative sliding movement between the device and a wearer's belt.

3. A device as defined in claim 2 wherein said passageway is disposed generally vertically when in use, said passageway being of substantially uniform height and width to snugly receive a wearer's belt.

4. A device as defined in claim 2 wherein said elongated portion extends downwardly with respect to said first end portion so that said second end portion is positioned rearwardly and below said first end portion.

* * * * *